Jan. 13, 1931. C. C. CALKINS 1,788,617
SEED TREATING MACHINE
Filed March 25, 1929
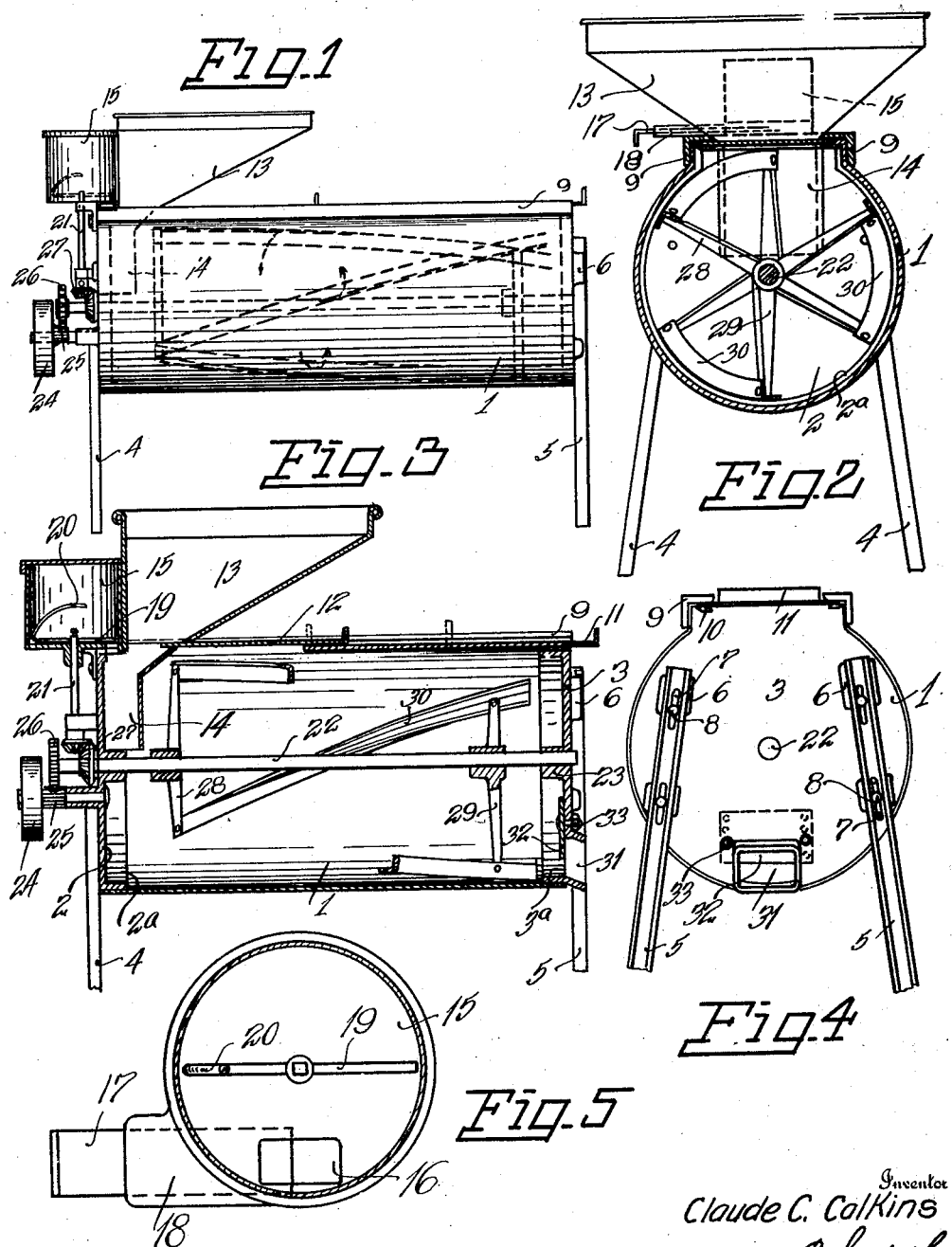
Inventor
Claude C. Calkins
Herbert E. Smith
By
Attorney Patented Jan. 13, 1931

1,788,617

UNITED STATES PATENT OFFICE

CLAUDE C. CALKINS, OF SPOKANE, WASHINGTON

SEED-TREATING MACHINE

Application filed March 25, 1929. Serial No. 349,803.

My present invention relates to improvements in seed treating machines especially adapted for use in affixing or applying, by attrition, a powdered coating to seed grain before planting, which coating, after the seed grain has been planted will protect the seed against ravages of smut and other diseases.

The seed in this instance may be wheat, and the material for coating the wheat berries is preferably copper carbonate in finely powdered form.

In the performance of its functions the machine of my invention is adapted to tumble or agitate the grain and copper carbonate so that they will be closely intermingled with a frictional contact or rubbing movement between the berries and between the berries and the powder to insure a thorough and uniform coating of the protective powder for each seed before it can leave or be discharged from the machine.

In carrying out my invention I employ a stationary closed cylinder or drum to which the seed grain and the powder are fed or supplied by separate feed mechanisms, and by means of rotary agitators within the drum, the attritional coating of the seed grain is accomplished.

Because of the minimum number of parts utilized and of the simplicity both in construction and operation of the machine in which my invention is embodied, such machine may be manufactured in quantities at comparatively low cost of production, and manipulated with facility.

The invention consists in certain novel combinations and arrangements of parts for accomplishing the above set forth purpose as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation of a machine embodying my invention with interior operating parts shown in dotted lines.

Figure 2 is a transverse vertical sectional view through the mixing drum or cylinder.

Figure 3 is a vertical, longitudinal sectional view through the machine.

Figure 4 is a view in elevation at the discharge end of the machine.

Figure 5 is an enlarged horizontal sectional view through the powder feed hopper.

In the preferred form of my invention as illustrated in the drawings I utilize a stationary, cylindrical vessel or drum 1 that may be fashioned of sheet metal and provided with cast metal ends or heads 2 and 3 located respectively at the front or inlet end and the rear or discharge end of the machine. These heads are of circular shape and are provided with annular flanges 2a and 3a to which the ends of the drum are affixed in suitable manner to insure a dust-proof inclosure.

At the front the drum is supported on legs 4, and at the rear are provided legs 5 by means of which the discharge end of the drum may be vertically adjusted if desired. These legs 5 are secured to cleats 6 affixed to the outer face of the head 3 of the cylinder and the cleats are of channel shape in cross section to receive the legs. The cleats are arranged in spaced pairs as seen in Figure 4 and each leg near its upper end is provided with a pair of spaced longitudinally extending slots 7 for the clamp bolts 8 that are used to secure the legs to the cleats. When the bolts are loosened the legs may be adjusted vertically with relation to the fixed cleats and the discharge end of the drum is thus raised or lowered with relation to the front end of the drum.

The cylindrical drum is provided with a flat top portion that is bounded by a pair of spaced longitudinally extending angle iron plates 9 and each of these plates is used in connection with a base plate 10 to provide oppositely arranged guide grooves for a slide top or lid 11. The lid or slide top may be removed or opened as desired to gain access to the interior of the drum when necessary.

A slide gate 12 is also arranged in the top portion of the drum and guided in these grooves for use at the bottom of the hopper 13 from which the grain is fed to the drum through the vertically arranged chute 14. The slide gate may be moved to increase or diminish the size of the opening in the bottom of the hopper that communicates with the chute to control the feed of grain to the drum.

The copper carbonate or other protective powder is supplied from a hopper 15 located adjacent to the seed hopper, and both positioned above the drum to afford a gravity feed to the drum through the chute. The discharge opening 18 from the hopper 15 is provided with a slide gate 17 to vary the size of the opening and regulate the flow or feed of powder to the chute, said slide gate being movable in the guide extension or frame of the hopper and indicated as 18.

The finely powdered copper carbonate is stirred and agitated to prevent compacting by means of a rotary stirrer comprising a straight horizontal arm 19 and the curved arm 20 integral therewith, both of which are secured to the vertical shaft 21 to rotate therewith.

Within the drum is mounted a central, longitudinally extending main shaft 22 journaled at its ends in bearings 23 of the drum-heads and forming part of the rotary agitator for the commingling of the seed grain and carbonate as they are fed by gravity through the chute 14 from the respective hoppers. A drive pulley 24 receives power, as by a belt from a suitable source, to operate the agitator through the drive pinion 25 and the driven gear 26, the latter on the main shaft 22. By means of a bevel-gear couple 27 the stirrer shaft of the copper carbonate stirrer is operated from the main shaft of the agitator.

The rotary agitator within the drum in addition to the shaft includes spaced spider frames 28 and 29 secured near the ends of the shaft, and these spider frames are connected by three (or any other suitable number) blades 30 fashioned of angle-iron plates that extend longitudinally of the shaft and partially around the shaft, as in a spiral formation through an arc of approximately 60°. The ends of each blade are affixed to the spaced spider frames and as the agitator rotates or revolves these angular blades pick up the mixture of seeds and powder and then empty the material as the blade reaches the top of the drum. The spiral blades thus continuously pick up and deposit the mixed material and the formation of these blades effects a movement of the mixture toward the inlet or feed end of the machine.

At a low point in the discharge head of the drum an outlet or discharge nozzle or chute 31 is provided, and the size of the opening in the nozzle may be controlled and regulated by means of a slide gate 32 having perforations to receive the adjusting bolts 33 passed through the head 3 of the drum.

In operating the drum the material is fed therein until the top of the mass reaches an inclined line extending up from the top of the opening of the discharge spout to a point just above the bottom opening of the inlet or feed chute 14. Under such conditions the further feed of material through the chute is cut off, until a sufficient quantity has been discharged to permit feed of more material. The continuous agitation and forward movement of the mass insures the tumbling, rubbing, and frictional contact of the seeds and powder to coat the seeds and the coated seeds are discharged through the spout or chute 31 for future use.

It will be noted that the bottom opening of the chute 14 terminates above the longitudinal center of the drum; and therefore the incoming material is released above the center of the drum thus increasing the capacity of the drum. The feed of grain at this altitude above the center of the drum also increases the slope of top line of the material and insures speedy movement of the grain from the feed chute to facilitate feed of grain from the chute. The slope of the material from the chute may be varied by changing the height of the material at the outlet end of the drum, and this change at the outlet end of the drum is accomplished by vertically adjusting the gate 32 with relation to the discharge nozzle 31. In thus regulating the outlet opening, and thereby the height of the material at the opening, a sufficient quantity of material is maintained whereby the slope line will cross the longitudinal center of the drum while the machine is in operation.

Not only am I thus enabled to treat a maximum quantity of grain but the added weight of this large bulk of grain enhances the efficiency of the process of attrition, for it will be apparent that the heavier bulk of grain increases the friction between the seeds. This heavy mass of grain is also relatively slow in its movement toward the outlet nozzle, as the seeds are retarded by the increased friction.

By use of the angular bars 30 of the agitator the material is carried about the axis of the shaft 22, and the grains nearest the bars move faster toward the outlet end of the drum than those nearer the shaft, due to the positive and direct action of the agitator. Under the action of gravity, the agitated material is also continuously falling toward the bottom of the drum. Due to these two movements it will be obvious that the material cannot move in a solid mass, but the ever changing positions of the seeds and the continuously changing speeds at which the seeds move insure a continuous rubbing together of the kernels or seeds for the process of attrition.

Having thus fully described my invention, what I claim as new and desire to secure by Letters Patent is:—

1. The combination with a fixed drum having an interior gravity feed chute, a seed-hopper, a powder-hopper communicating with said chute and separate means for regulating feed from said hoppers, of a shaft journalled in the drum and spaced spider frames thereon, a plurality of agitator blades in partial spiral formation connecting said spider frames, a discharge spout for the drum, and an adjustable gate for the spout whereby the chute and gate co-operate to regulate the general slope of material in the drum.

2. In a seed treating machine, the combination with a stationary drum and a rotary agitator therein, of a perpendicular inlet chute at one end of the drum and an adjustable discharge valve at the other end of the drum, said chute and valve co-operating to regulate the general slope of the material in the drum.

In testimony whereof I affix my signature.

CLAUDE C. CALKINS.